US010318965B2

(12) United States Patent
Drabble et al.

(10) Patent No.: US 10,318,965 B2
(45) Date of Patent: Jun. 11, 2019

(54) METHOD AND APPARATUS FOR PROVIDING LOCATION SPECIFIC INFORMATION

(75) Inventors: Christopher Peter Drabble, Hampshire (GB); Gary Paul Noble, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 1799 days.

(21) Appl. No.: 12/016,255

(22) Filed: Jan. 18, 2008

(65) Prior Publication Data
US 2008/0183485 A1  Jul. 31, 2008

(30) Foreign Application Priority Data

Jan. 31, 2007 (EP) .................................... 07101497

(51) Int. Cl.
*G06Q 30/02* (2012.01)
*H04W 4/021* (2018.01)
(52) U.S. Cl.
CPC ............ *G06Q 30/02* (2013.01); *H04W 4/021* (2013.01)
(58) Field of Classification Search
CPC ....... H04W 4/02; H04W 4/021; H04W 4/023; H04W 4/025; G06Q 10/00; G06Q 30/02
See application file for complete search history.

(56) References Cited

U.S. PATENT DOCUMENTS 6,509,830 B1 * 1/2003 Elliott .................. H04W 64/00
340/286.02

2005/0055308 A1 * 3/2005 Meyer et al. .................... 705/38
2006/0099971 A1 * 5/2006 Staton et al. ............... 455/456.6
(Continued)

FOREIGN PATENT DOCUMENTS

WO       WO 01/71606 A1 *  9/2001  ............. G06F 17/60

OTHER PUBLICATIONS

Munson et al.; A Rule-based System for Sense-and-Respond Telematics Services; USENIX Association; EESR '05: Workshop on End-to-End, Sense-and-Respond Systems, Applications, and Services; pp. 31-36.

(Continued)

*Primary Examiner* — Gerardo Araque, Jr
(74) *Attorney, Agent, or Firm* — Schmeiser, Olsen & Watts, LLP; Mark Vallone

(57) ABSTRACT

A method and apparatus for providing location specific information. Event data pertaining to an event is received from an event reporting system that has gathered the event data from a data gathering means. The event data includes location identification data, event type data, and event description data. At least one geofence associated with the location identification data is identified from the location identification data in the received event data. Each geofence of the at least one geofence has a geometric shape located within a geographic area. A topic associated with the event type data and associated with the identified at least one geofence is identified. Subscribers having a subscription to the topic in association with the geographic area are identified. The subscription entitles the subscribers to be notified about events pertaining to the topic in association with the selected geographic area. The event description data is published to each subscriber.

20 Claims, 6 Drawing Sheets

(56) References Cited

U.S. PATENT DOCUMENTS

2008/0125965 A1* 5/2008 Carani et al. ............... 701/207

OTHER PUBLICATIONS

Chen et al.; An Efficient Spatial Publish/Subscribe System for Intelligent Location-Based Services; DEBS03 2003, San Diego USA; Copyright 2003 ACM; 6 pages.

Cugola et al.; On Introducing Location Awareness in Publish-Subscribe Middleware; Fourth International Workshop on Distributed Event-Based systems (DEBS) (ICDCW'05); [Retrieved Jul. 30, 2007]; 2 pages.

Eugster et al.; Location-based Publish/Subscribe; Fourth IEEE International Symposium on Network Computing and Applications; [Retrieved Jul. 30, 2007]; 2 pages.

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>, 7 pages.

* cited by examiner

METHOD AND APPARATUS FOR PROVIDING LOCATION SPECIFIC INFORMATION

FIELD OF THE INVENTION

The invention relates generally to the field of location based awareness systems, and in particular the invention relates to a publish and subscribe system in a geofence environment.

BACKGROUND OF THE INVENTION

Location based services have been known for some years in which users of location aware devices are able to request information from a location based service about services or points of interest specific to a user's present location. Typically, a user enters into a device some information about the user's current location, or alternatively the device may have a 'where am I' function and the device via GPS locates the current location of the device. The device then returns a list of nearby services or points of interest. A user is then required to browse through the list and select the items of interest.

The above approach for finding location specific information has drawbacks because a user is required to request location specific information each time the user enters, for example, a new town or a new city. The location awareness device then lists a number of location specific data which may or may not be of relevance to the user.

With the advent of many different types of systems offering users a variety of geospatial information, a challenge arises in how to efficiently communicate this information to requesting users.

Unfortunately, existing systems are overly complex.

SUMMARY OF THE INVENTION

The present invention provides a method for providing location specific information, said method configured to be implemented in a data processing network, said method comprising:

receiving event data pertaining to an event from an event reporting system that has gathered the event data from a data gathering means, wherein the event data comprises location identification data from which a location of the event may be determined, event type data specifying a category of the event, and event description data that describes the event;

identifying, from the location identification data in the received event data, at least one geofence associated with the location identification data, wherein each geofence of the at least one geofence has a geometric shape located within a geographic area;

identifying a topic associated with the event type data and associated with the identified at least one geofence;

identifying at least one subscriber having a subscription to the topic in association with the geographic area, said subscription entitling the at least one subscriber is to be notified about events pertaining to the topic in association with the selected geographic area; and publishing the event description data to each subscriber of the identified at least one subscriber.

DETAILED DESCRIPTION OF THE INVENTION

Figure 1:
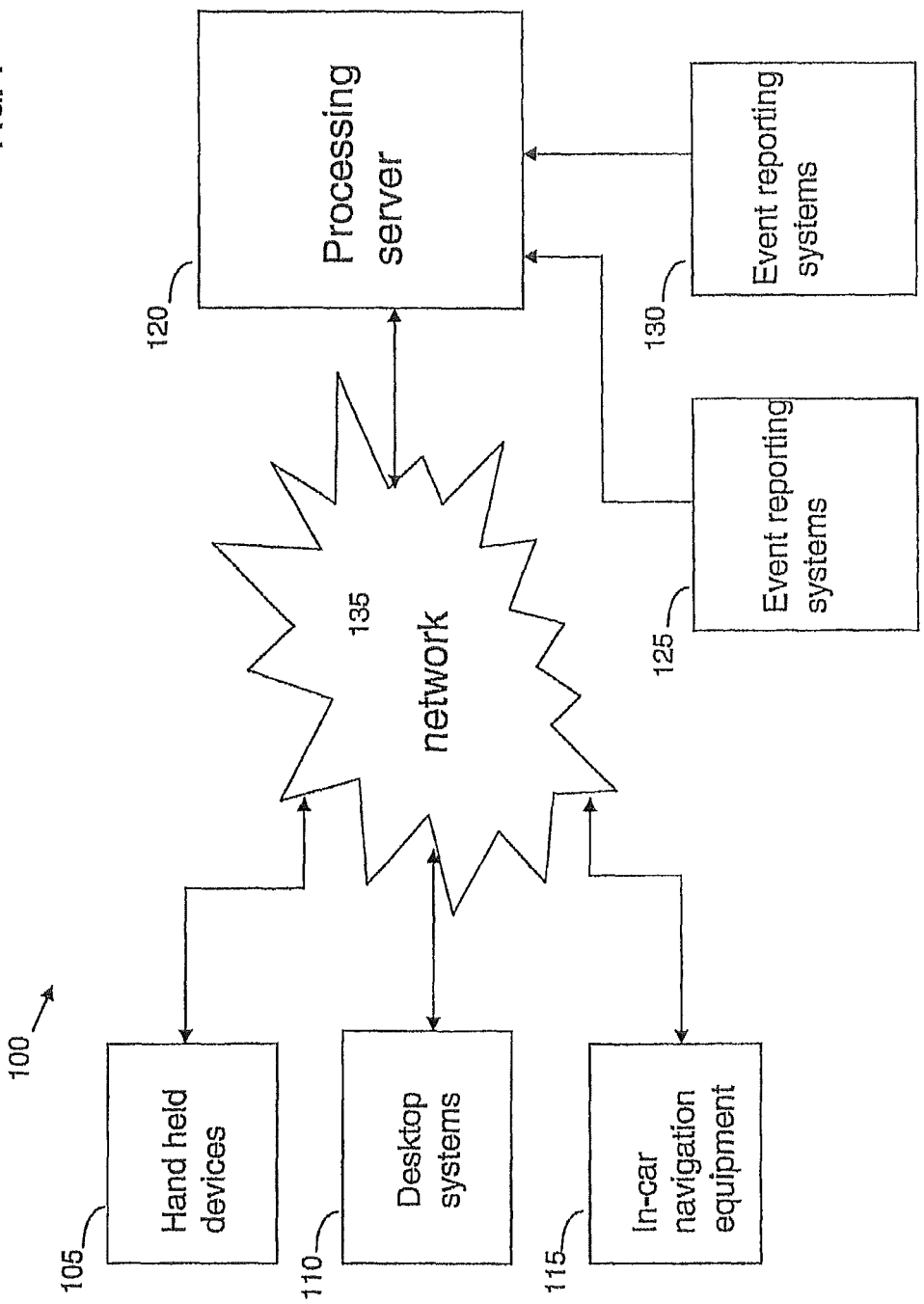
FIG. 1 is a block diagram showing a distributed computing system in which the present invention may be implemented.

In one embodiment, the present invention comprises an event broker operable in a data processing network, for processing requests for receiving event data associated with a geographic location, the event broker comprising: a mapping component for receiving event data from an event reporting means wherein the event data comprises location identification data, event type data and a characteristic of the event; a mapping component for identifying a geofence associated with the location identification data; a publisher component for identifying from the identified event type data and the identified geofence, a subscriber subscribing to a topic associated with the event type data in the identified geofence; and a publisher component publishing to the identified subscriber the characteristic of the event identified in the event data.

Advantageously, the present invention provides an efficient mechanism in which to publish event information requested by subscribers. A subscriber can select a number of topics that the subscriber is interested in receiving information about. A subscriber's topic selection is stored in a data store for accessing by a publishing component. Event data is received by the event broker as and when an event takes place. The event data is in the form of a data stream comprising information associated with the geographical location of the event, the type of event that has happened, and some information that describes the event. The mapping component extracts geographic location and uses this data to identify one or more geofences associated with the geographic location of the event. Once a geofence has been located, the geographic topics associated with the geofences are located. Some geographic topics may be associated with one or more geofences. The mapping component produces a list comprising the search information and communicates the list to a publisher component. The publisher component determines which subscribers have subscribed to which topics and then matches the subscribers to the geographic topics in the requested geofence. The publisher component then publishers to the subscribers the event data associated with the topics that the subscribers have subscribed to.

The present invention comprises an event broker, wherein the mapping component further comprises mapping means for mapping a topic to a geofence.

The present invention provides an event broker, wherein a topic forms part of a hierarchical topic tree.

The present invention provides an event broker, wherein each topic in the hierarchical topic tree is associated with a geofence.

The present invention provides an event broker, wherein the publisher component further comprises locating a subscriber's preferred communication means from a subscriber's profile.

The present invention provides an event broker, wherein a geofence comprises a customizable virtual boundary delimiting a geographical area.

The present invention provides an event broker, wherein the identification data is associated with geographic location.

The present invention provides an event broker, wherein the identification data is associated with a data gathering means associated with a geographic location.

The present invention provides an event broker, wherein the data gathering means is a camera, speed sensor apparatus, RFID reader, or GPS device.

The present invention provides an event broker, wherein the data gathering means is a traffic reporting system.

The present invention provides an event broker, wherein the identification data is associated with a traffic light or other object associated with a geographic location.

The present invention provides an event broker, wherein the location identification data comprise coordinates identifying a geographic location.

The present invention provides an event broker, wherein the event type data comprises a category of information pertaining to traffic events.

In one embodiment, the present invention provides a computer program product loadable into an internal memory of a digital computer, said computer program product comprising software code for performing, when said software code is run on a processor of the digital computer, the methods of the present invention.

In one embodiment, the present invention provides a method operable in a data processing network, for processing requests for receiving event data associated with a geographic location, the method comprising the steps of: receiving event data from an event reporting means, wherein the event data comprises location identification data, event type data and a characteristic of the event; identifying a geofence associated with the location identification data; identifying from the identified event type data and the identified geofence, a subscriber subscribing to a topic associated with the event type data in the identified geofence; and publishing to the identified subscriber the characteristic of the event identified in the event data.

FIG. 1 is a block diagram illustrating a distributed computing system 100 comprising a data processing network, in accordance with embodiments of the present invention. The computing system 100 comprises a plurality of requesting devices, for example, hand held devices 105, desktop computers 110, in-car navigation systems 115, etc. All of these devices communicate over a network 135 with a processing server 120. The processing server 120 processes requests for services from each of the requesting devices 105, 110, 115 and processes each of the service requests for communicating back to each requesting device 105, 110, 115.

The processing server 120 interfaces with an event reporting means represented by event reporting systems 125, 130 such as traffic reporting systems. A person skilled in the art will realize that other types of event reporting systems could interface with the processing server such as weather reporting systems, health reporting systems, etc.

In one embodiment, event reporting systems 125, 130 are traffic reporting systems 125, 130 that gather event data from a data gathering means situated along a roadside, from a data gathering means operable for use within a vehicle or from a phone call to a call centre etc. The data gathering means may be a camera, speed sensor apparatus, a RFID reader, or a GPS device. The event data comprises a unique identifier associated with the location of the data gathering means, event type data, and event description data that is associated with the event and describes the event. For example, the unique identifier may comprise the positional coordinates (e.g., X and Y rectangular coordinates) of the data gathering means, the event type data may comprise a category of event called road traffic accident, and the event data will describe the event that has happened; for example, a road accident at Junction 3 of the M3 motorway.

Alternatively, the event data may comprise a unique identifier associated with a camera, set of traffic lights, or other stationary object that has a fixed graphical location at a specific geographic location in a geofence.

Traffic reporting systems 125, 130 communicate traffic data to the processing server 120 in real time; i.e., as an event is detected by the data gathering means, the traffic reporting systems 125, 130 communicate this information to the processing server 120.

The processing server 120 receives the event data and communicates the event data to an event broker, operable for use with the processing server 120.

Figure 2:
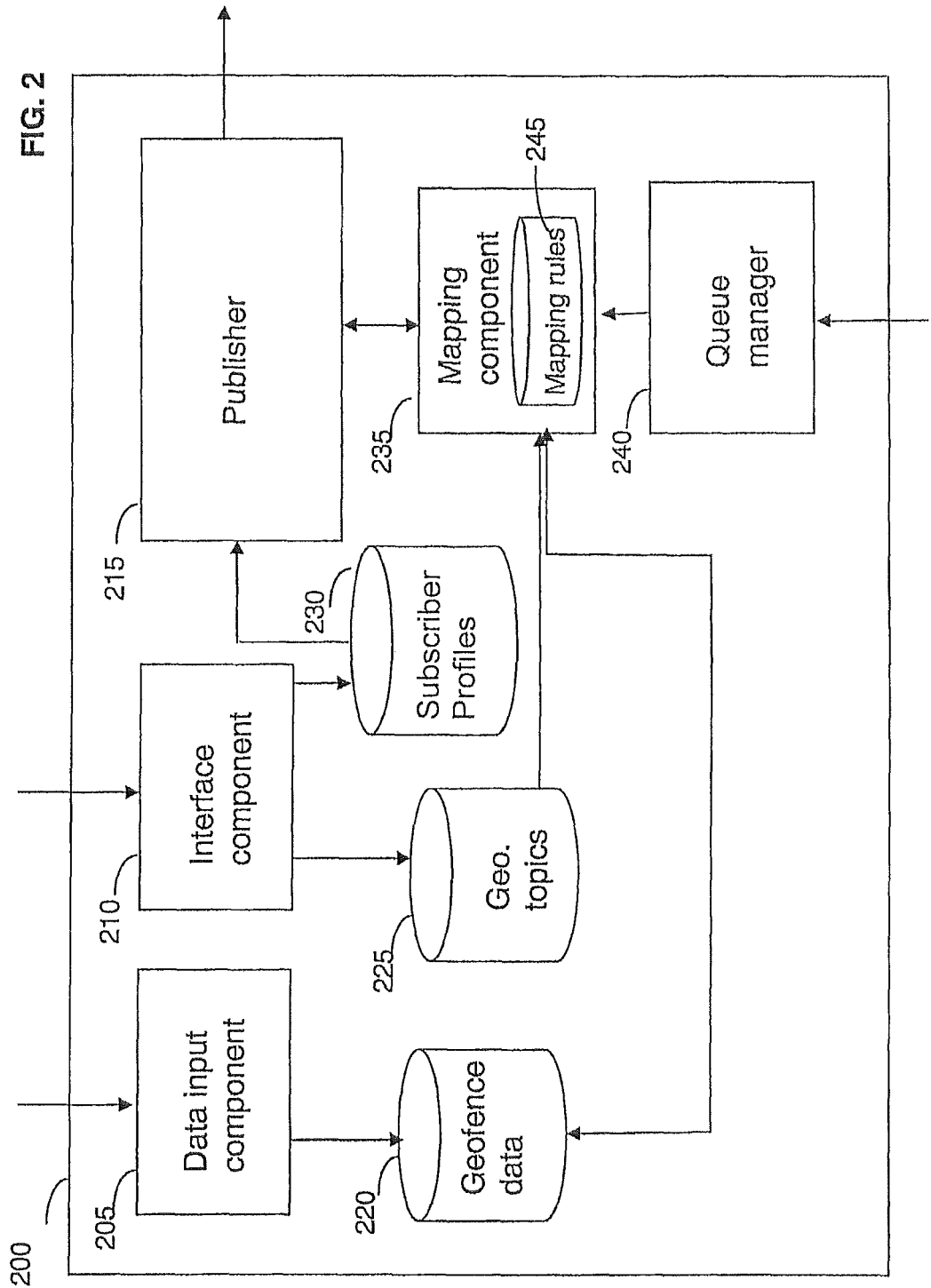
FIG. 2 is a block diagram showing an event broker, in accordance with embodiments of the present invention.
Figure 3:
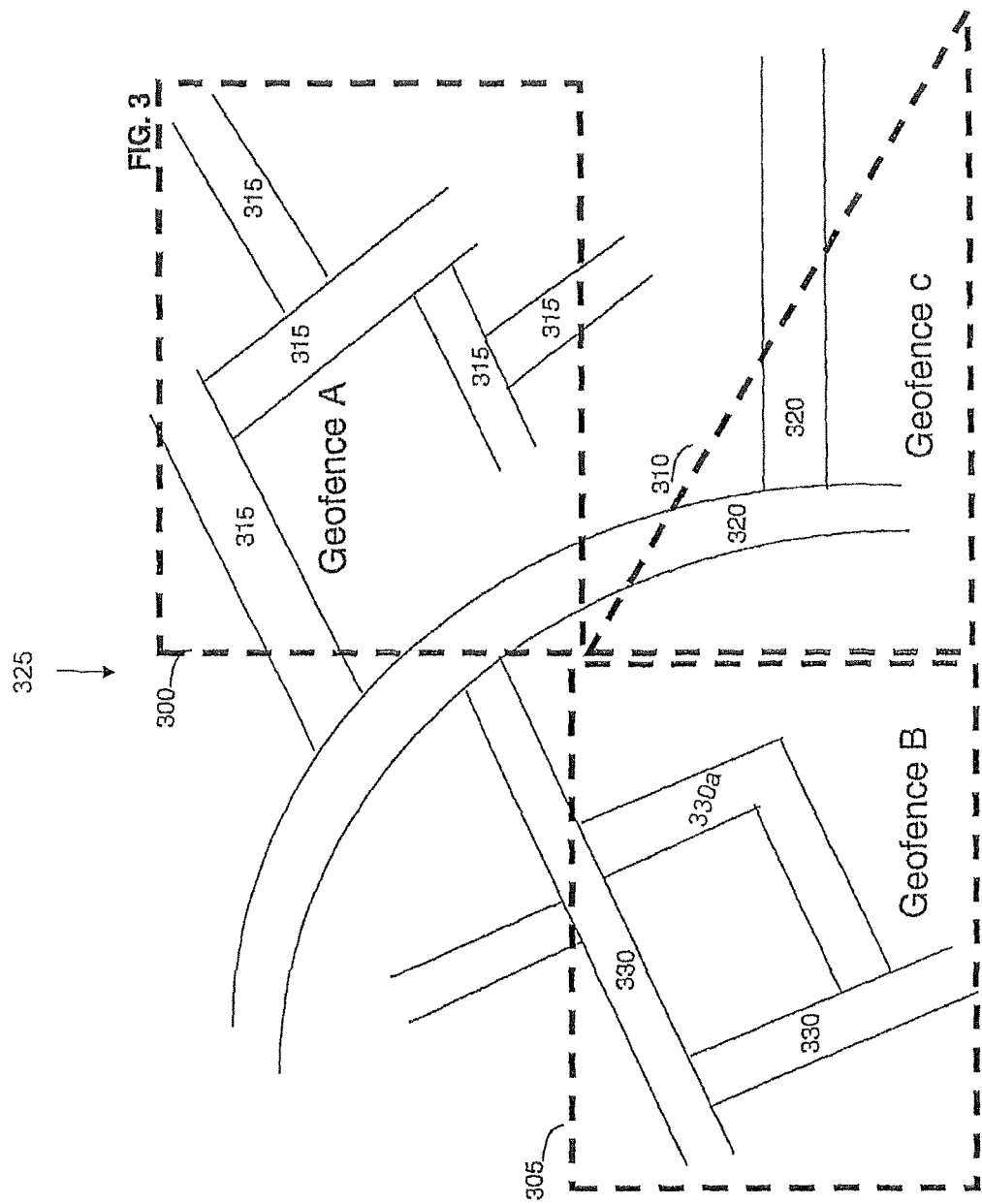
FIG. 3 is a block diagram showing a map comprising a plurality of geofences.

In accordance with embodiments of the present invention and with reference to FIGS. 2 and 3, an event broker 200 allows a user to subscribe to geographic topics of interest which are associated with geofences in which events occur. A geofence comprises a geometric shape located in a geographic area, wherein the geometric can be of any shape or any size, such as a line, a point, a two dimensional shape (e.g., an area), a three dimensional shape, etc. A geofence is customizable and is not necessarily static in position but can grow and shrink dynamically depending on the nature of the application. For example, if tracking the spread and growth of a flu epidemic, the geofence may comprise a geometric shape that grows and shrinks dynamically as and when the flu epidemic grows and shrinks across a geographic area.

FIG. 2 illustrates the components of the event broker 200, in accordance with embodiments of the present invention. The components comprise a data input component 205 for receiving data associated with a geofence and a number of topics associated with one or more geofences, a first and second data store 220, 225 for storing the received data, an interface component 210 for receiving subscriber requests for topics of interest, a queue manager 240 for queuing event data received from event reporting systems 125, 130, a mapping component 235 for determining whether the real time event data is associated with a geofence and geographical topics associated with the geofence, and a publishing component 215 determining which subscriber have subscribed to which topics and publishing to the subscribers their selected topics of interest based on received event data from the event reporting systems 125, 130. Each of these components will be explained in turn.

The data input component 205 receives data associated with geofences associated with a geographic area and a number of geographic topics associated with a geofence.

The first data store 220 stores geographic data (e.g., X and Y coordinate data) pertaining to a plurality of geofences located across a geographic area.

FIG. 3 shows an example of a geographic area 325 having a plurality of geofences, in accordance with embodiments of the present invention. The geographic area 325 comprises a plurality of roads 315, 320, 330, 330a and three geofences 300, 305, 310, for example, geofenced areas A, B and C. Each geofence 300, 305, 310 forms a virtual boundary delimiting portions of a road. For example, in geofenced area B 305 it can be seen that only a portion of road 330 is associated with geofenced area B 305, but the whole length of road 330a is within the boundary of geofenced area B 305.

Each geofence is associated with a geographic topic such as a county, town, village or road of other point of interest. The geographic topics are stored as a naming schema in the second data store 225. The naming schema stores the geographic topics as a hierarchy of geographic topics such as in the example below:

Example 1

Topic: /country/county/town/postcode/road etc.
More complicated naming schemas can be devised such as:

Example 2

Topic: /City/North/Area B/Sub C/Sub D
wherein each data element can comprise further sub sections and so on.

The naming schema allows for child topics to be stored along with parent topics, for example, England/Hampshire/Winchester/SO53/St Cross Road etc. Thus the parent topic in this example is a 'Country' called 'England' which has a 'county' called 'Hampshire', 'Hampshire' has a town called 'Winchester', a part of 'Winchester' has a 'postcode' starting with the characters 'SO53' and the 'postcode' is where a road called 'St Cross road' is located.

The hierarchical naming schema maps onto geofences 300, 305, 310, thus providing a navigable method of storing and navigating geographic topics in relation to associated geofences 300, 305, 310. Geofences 300, 305, 310 can also be categorized into a hierarchy based on area and thus a hierarchical geographic topic schema maps onto a hierarchical geofence schema and provides an efficient and quick means for navigating through information on the receipt of event data from the event reporting means.

Thus the present invention may utilize a hierarchical topic tree comprising hierarchically sequenced topics in a tree structure. In one embodiment, each topic in the hierarchical topic tree is associated with at least one geofence.

Moving back to FIG. 2, the interface component 210 also receives subscriptions to topics from a plurality of subscribers, which are stored in a further data store 230. A topic comprises a subject that a user wishes to be notified about, for example, a topic may be a topic associated with road traffic accidents, road works, or road closure etc. The interface component 210 comprises selection means 245 (e.g., mapping rules) for a subscriber to select a geographic area of interest and in response to the selection means, the subscriber can select an event of interest associated with the geographic area of interest. Alternatively, a subscriber can first select a topic of interest and the interface component in response to the first selection means provides second selection means 245 for selecting a geographic area of interest.

For example, a subscriber may travel every day to work from the city of Winchester to the city of London using the M3 motorway and therefore wants to be notified of road accidents occurring along the M3 motorway. Thus the subscriber can select the portion of the M3 motorway that the subscriber travels along, for example, between junctions 4 and 2.

The subscribers may select other query parameters such as 'only send me traffic reports along the M3 motorway from junction 4 to junction 2 between the hours of 7:30 am and 9:00 am representing a daily time interval. Each subscriber's selections are stored in a data store along with each subscriber's profile. Each subscriber's profile also stores information associated with each subscriber, such as, the delivery means according to which each subscriber independently chooses to receive the event data that each subscriber has subscribed to.

A queue manager 240 receives an event data stream from the processing server 120 (which receives the event data stream from the event reporting systems). The event data stream is stored by the queue manager 240 for communicating on request to the mapping component 235.

The mapping component 235 processes the event data stream to extract the coordinates of the geographic location of the event, data associated with the event type, and the data that describes what event has occurred. An example of an event data stream is shown below.
Event Data Stream
traffic event: X443299,Y120882/road accident/traffic slow.

The example above illustrates one example of an event data stream. In this example, X and Y coordinates (i.e., 443299 and 120882) specify the location of the traffic event, the next data element details the event type (i.e., road traffic accident), and the last data element specifies the event that has happened or is continuing to happen (i.e., traffic slow).

The mapping component 235 parses the event data stream and extracts the X and Y coordinates, the event type, and the event data. The mapping component 235 communicating with a set of rules 245 identifies which geofences 300, 305, 310 the X and Y coordinates fall within (for example, geofence 300 and geofence 310). The rules 245 comprise mapping rules which map X and Y coordinates to geographical locations associated with geofences 300, 305, 310.

The X and Y coordinates may fall within a single geofence 300 or within multiple geofences 300, 305, 310; i.e., one of the coordinates may start in the delimitation of a first geofence 300 but finish in the delimitation of a second geofence 305 because of two overlapping geofences which overlap each other in an overlap area (i.e., the geofences 300 and 305 may overlap each other in an overlap area in the preceding example).

The mapping component 235 returns a list of geofences 300, 305, 310 which the mapping component 235 identifies the event type data falling within. The list also comprises the name of the event type that has occurred; e.g., road traffic accident. The mapping component 235 transmits the list to the publishing component for processing.

The publishing component 235, using each entry in the list, searches data store 230 to identify if a subscriber has subscribed to an event type in the identified geofence. For example, if the list comprises an entry for a road traffic accident in geofence area 300, then the mapping component 235 searches for a subscriber that has subscribed to be notified of road traffic accidents taking place in geofence 300.

A further list of search results is returned, detailing the subscribers which have subscribed to the event type listed above. The mapping component 235 generates a data package comprising the subscriber's identification details, the subscriber's data delivery means, and the event data (i.e., road traffic accident at location Junction 3 of North bound of M3 motorway) and communicates the data package to the publishing component 215 for publishing to subscribers.

Figure 4:
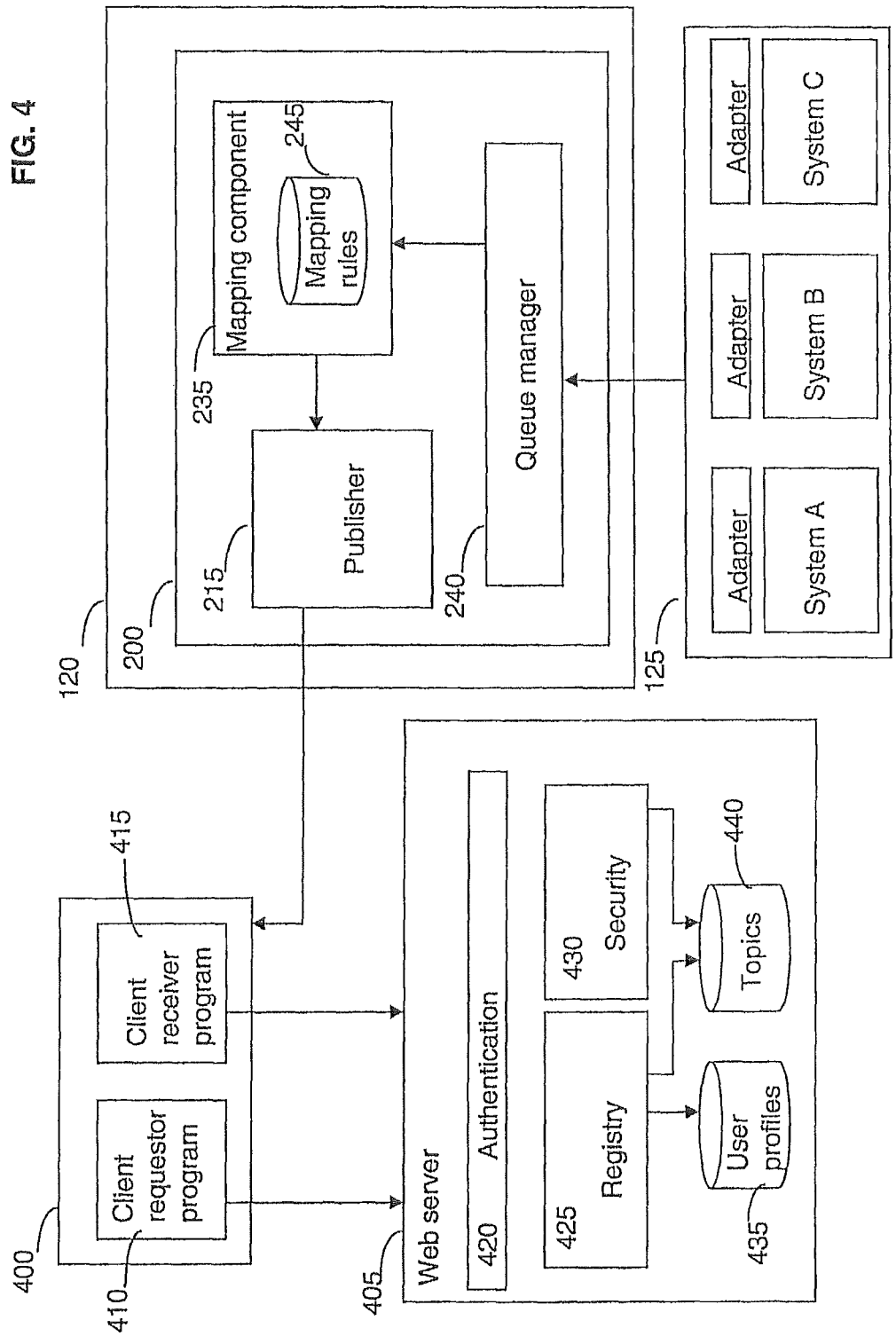
FIG. 4 is a block diagram illustrating the event broker operating in a distributed computing environment of FIG. 1, in accordance with embodiments of the invention.

FIG. 4 is a block diagram illustrating the event broker 200 operating in the distributed computing system 100 of FIG. 1, in accordance with embodiments of the invention. FIG. 4 shows an embodiment of the present invention wherein the subscriber is a user of a computer device 400 having a client requester program 410 and a client receiver program 415.

The client requester program 410 comprises means for subscribing to topics of interest and communicating the requested topics to a web server for processing 405. The client receiver program 410 receives the requested subscriber information from a publisher component 215 located on a processing server 200. The client requester 410 and receiver program 415 may comprise an internet requester and receiver program, an SMS requester and receiver program or an instant messaging client and receiver device. However, a person skilled in the art will realize that this list is not exhaustive and other client and requester programs can be envisaged.

The web server 405 comprises a register component 425 for allowing a user to register with the event broker 200, an authentication component 420 for providing authentication services after registration and a security component 430 for providing security services. The web service also manages and maintains subscriber profiles 435 (for example, updating a subscriber's profile with new delivery means data) and the topics 440 that a subscriber wishes to subscribe to.

The processing server 120 comprises the event broker 200 which includes the publisher component 215, the mapping component 235, the mapping rules 245, and the queue manager 240. The queue manager 240 receives event data from event reporting systems 125. The event reporting system 125 may comprise a plurality of disparate event reporting systems (i.e., system A, system B, system C). Each event reporting system of the plurality of disparate event reporting systems may comprise an adapter component for formatting the data into a format compatible with the queue manager 240 of the processing server 200.

Figure 5:
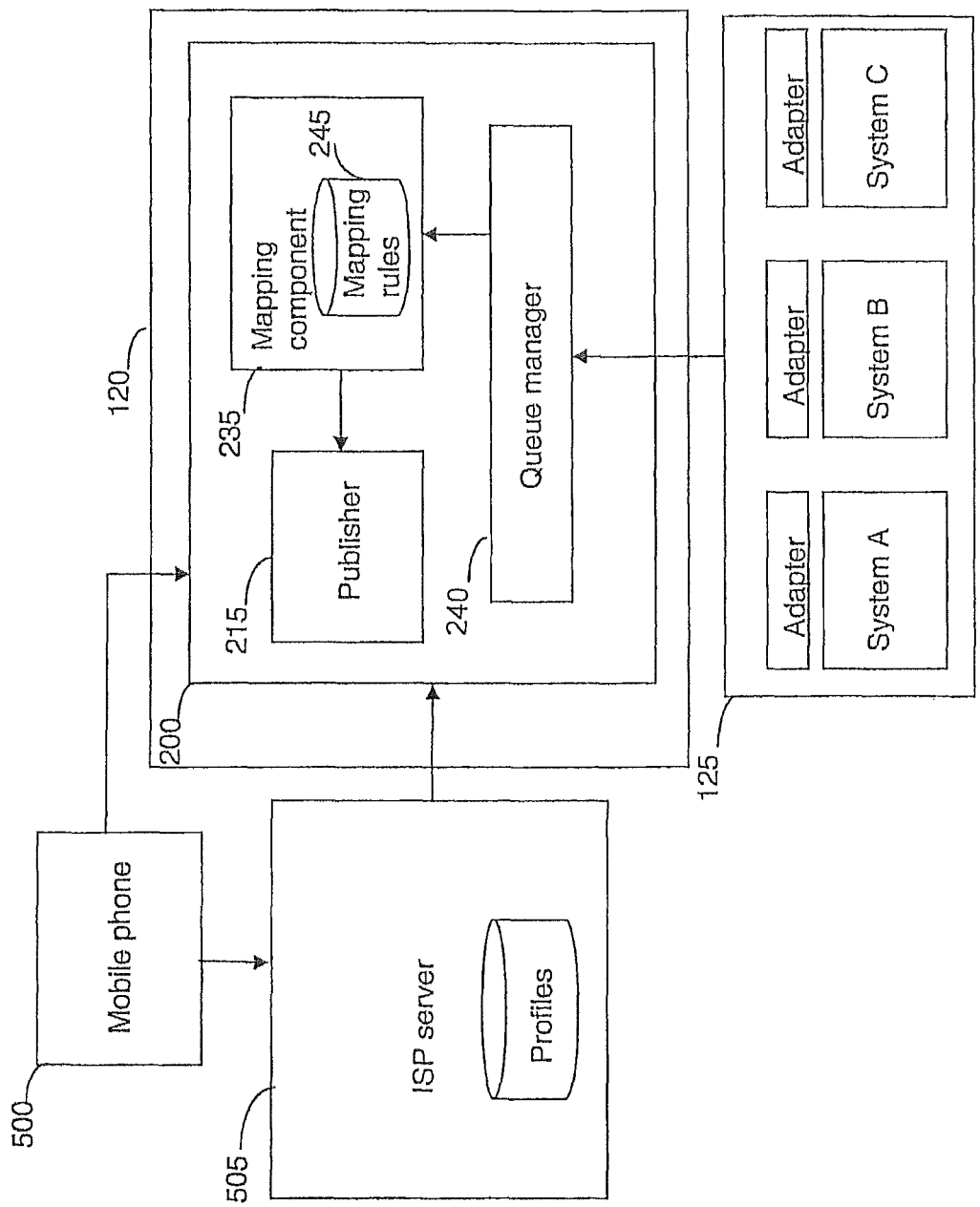
FIG. 5 is a block diagram illustrating the event broker operating in a telecommunication environment in accordance with embodiments of the present invention.

FIG. 5 is a block diagram illustrating the event broker 200 operating in a telecommunication environment in accordance with embodiments of the present invention. In FIG. 5, the present invention is operable in a telecommunication environment, wherein a mobile device 500, such as a mobile phone, comprises a client requester and receiver program and is operable for communicating with the processing server 120. The processing server 120 interfaces with an internet service provider's processing server 505. The internet service provider's processing server 505 manages the subscriber's profiles, registration, authentication and security services for the subscriber. The processing server 120 comprises the event broker 200 which includes the publishing component 215 for publishing subscriber's requests to the subscribers, the mapping component 235, the mapping rules 245, and the queue manager 240. The queue manager 240 queues the event data received from the event reporting systems 125. The event reporting system 125 may comprise a plurality of disparate event reporting systems (i.e., system A, system B, system C). Each event reporting system of the plurality of disparate event reporting systems may comprise an adapter component for formatting the data into a format compatible with the queue manager 240 of the processing server 200.

Figure 6:
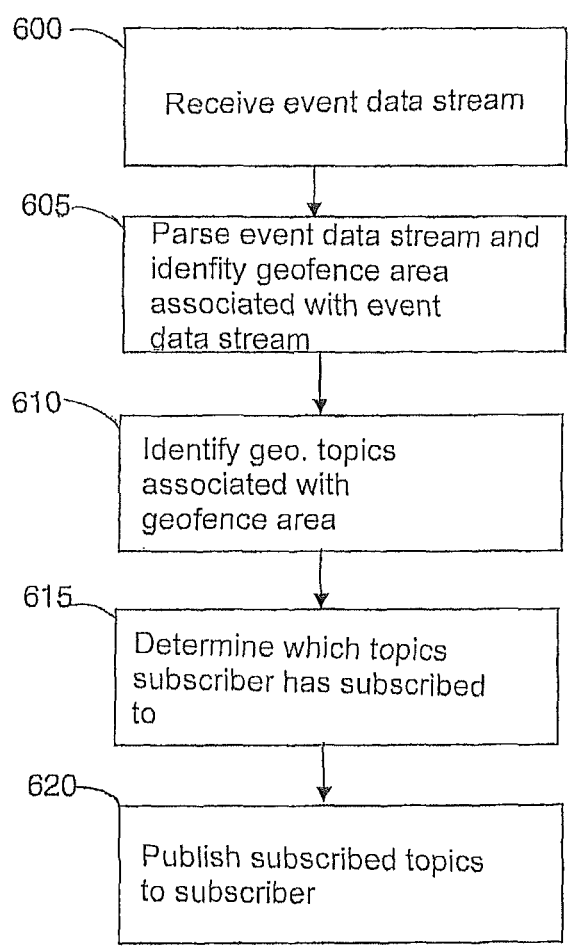
FIG. 6 is a flow chart detailing the operational steps of an embodiment of the present invention.

FIG. 6 is a flow chart detailing the operational steps of an embodiment of the present invention. At step 600, the mapping component 235 receives an event data stream from the queue manager 240; for example, Event data/X4440,Y2222/road accident/traffic slow M3 Junction 3 North bound.

At step 605, the mapping component 235 parses the event data stream and extracts the X and Y coordinates (4440 and 2222) of the location of the event, the event data (road accident), and the description data (traffic slow M3 Junction 3 North bound). Using this X and Y coordinate data, the mapping component 235 performs a lookup in the data store 220 to identify the one or more geofences within which the X and Y coordinates are located (for example, X and Y coordinates being delimited by geofences 300 and 310).

Following identification of the one or more geofences, step 610 performs a further search to identify the topics associated with each of the geofences (for example, road traffic reports).

Step 615 performs another search by the publishing component 215 to identify which subscribers have subscribed to traffic reports in the geofences previously identified in step 605.

In step 620, the publishing component 215 communicates the event description data to the identified subscribers.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for providing location specific information, said method configured to be implemented in a data processing network, said method comprising:

a processing server of the data processing network receiving subscriptions to topics subscribed to by a plurality of subscribers, wherein the processing server comprises three distinct data stores consisting of a first data store, a second data store, and a third data store, wherein first data stored in the first data store consists of a plurality of locations and an associated at least one geofence within which each location stored in the first data store is located interior to each exterior boundary of the at least one geofence, wherein second data stored in the second data store consists of a plurality of topics and a geofence to which each topic is associated such that each said geofence identified in the second data store is identified in the first data in the first data store in association with a location of the plurality of locations, wherein third data stored in the third data store consists of a subscriber profile of each subscriber of the plurality of subscribers along with a topic that each subscriber has subscribed to such that each subscribed to topic is comprised by the plurality of topics in the second data in the second data store, and wherein each geofence has a geometric shape located within a geographic area;

after said receiving subscriptions, said processing server receiving event data pertaining to an event that has occurred, said event data being received from an event reporting system that has gathered the event data from a data gathering means situated where the event has occurred, wherein the event data comprises location identification data from which a location of the event may be determined and event description data that describes the event;

after said receiving event data, said processing server identifying, from analysis of the location identification data in the received event data and the first data stored in the first data store, one or more geofences associated with the location determined from the location identification data;

after said identifying one or more geofences, said processing server identifying, from analysis of the identified one or more geofences and the second data stored in the second data store, at least one topic associated with each geofence of the identified one or more geofences;

after said identifying at least one topic associated with each geofence of the identified one or more geofences, said processing server identifying, from analysis of each identified topic and the third data stored in the third data store, at least one subscriber of the plurality of subscribers having a subscription to at least one topic associated with a geofence of the identified one or more geofences; and after said identifying at least one subscriber, said processing server publishing the event description data across a network to a computer device directly accessed by each subscriber of the identified at least one subscriber, wherein the event is a road traffic accident, wherein the at least one topic associated with a first geofence of the identified one or more geofences includes a first topic of road traffic accidents, and wherein the at least one subscriber has a subscription to the first topic pertaining to road traffic accidents.

2. The method of claim 1, wherein the stored subscriber profile in the third data store for each subscriber comprises a delivery means independently selected by each subscriber, wherein the identified at least one subscriber comprises at least two subscribers, and wherein said publishing comprises publishing the event description data to each subscriber of the at least two subscribers via the delivery means independently selected by each subscriber of the at least two subscribers.

3. The method of claim 1, wherein the stored subscriber profile in the third data store for a first subscriber of the at identified least one subscriber comprises a daily time interval, and wherein the method comprises:

said processing server determining that the event has occurred during the daily time interval; and said processing server publishing the event description data to the first subscriber in response to said determining that the event has occurred during the daily time interval.

4. The method of claim 1, wherein said receiving event data comprises receiving the event data by a queue manager in the processing server from a plurality of disparate event reporting systems comprising said event reporting system that has gathered the event data, and wherein each disparate event reporting system comprises an adapter component that formats the event data into a format compatible with the queue manager.

5. The method of claim 1, wherein the location identification data comprises X and Y coordinates of the location of the event, and wherein the method further comprises said processing server parsing the received event data to determine said X and Y coordinates, and the event description data.

6. The method of claim 1, wherein a geofence of the identified one or more geofences forms a virtual boundary delimiting portions of a road.

7. The method of claim 1, wherein the location identification data comprises a unique identifier associated with a stationary object at a location of the data gathering means.

8. The method of claim 7, wherein the stationary object is a set of traffic lights.

9. The method of claim 1, wherein the identified one or more geofences comprises a first geofence and a second geofence which overlap each other in an overlap area, and wherein the location of the event specified by the location identification data is in the overlap area.

10. The method of claim 1, wherein the geometric shape of a geofence of the identified one or more geofences is configured to grow and shrink dynamically.

11. The method of claim 1, wherein a hierarchical geographic topic schema stored in the second data store comprises topics hierarchically sequenced as geographic areas such that each geographic area after a topmost geographic area is a child of and is contained within an immediately preceding geographic area in the geographic topic tree, wherein a hierarchical geofence schema stored in the second data store categorizes geofences into a hierarchy based on geographic area, wherein said identifying the at least one topic associated with each geofence comprises utilizing a mapping of the hierarchical geographic topic schema onto the hierarchical geofence schema to find said at least one topic associated with each geofence such that said at least one topic is found to be at least one geographic area in the hierarchical geographic topic schema.

12. The method of claim 11, wherein the at least one geographic area in the hierarchical geographic topic schema consists of a plurality of geographic areas in the hierarchical geographic topic schema, and wherein the at least one topic associated with each geofence consists of the plurality of geographic areas in the hierarchical geographic topic schema.

13. The method of claim 1, wherein the data gathering means is selected from the group consisting of a camera, a speed sensor apparatus, a RFID reader, and a GPS device, and wherein the method further comprises:

said data gathering means gathering the event data.

14. A computer program product stored in a computer readable storage device and loadable into an internal memory of a digital computer, said computer program product comprising software code configured to be executed on a processor of the digital computer to perform a method for providing location specific information, said method configured to be implemented in a data processing network, said method comprising:

a processing server of the data processing network receiving subscriptions to topics subscribed to by a plurality of subscribers, wherein the processing server comprises three distinct data stores consisting of a first data store, a second data store, and a third data store, wherein first data stored in the first data store consists of a plurality of locations and an associated at least one geofence within which each location stored in the first data store is located interior to each exterior boundary of the at least one geofence, wherein second data stored in the second data store consists of a plurality of topics and a geofence to which each topic is associated such that each said geofence identified in the second data store is identified in the first data in the first data store in association with a location of the plurality of locations, wherein third data stored in the third data store consists of a subscriber profile of each subscriber of the plurality of subscribers along with a topic that each subscriber has subscribed to such that each subscribed to topic is comprised by the plurality of topics in the second data in the second data store, and wherein each geofence has a geometric shape located within a geographic area;

after said receiving subscriptions, said processing server receiving event data pertaining to an event that has occurred, said event data being received from an event reporting system that has gathered the event data from a data gathering means situated where the event has occurred, wherein the event data comprises location identification data from which a location of the event may be determined and event description data that describes the event;

after said receiving event data, said processing server identifying, from the location identification data in the received event data and the first data in the first data store, one or more geofences associated with the location determined from the location identification data;

after said identifying one or more geofences, said processing server identifying, from analysis of the identified one or more geofences and the second data stored in the second data store, at least one topic associated with each geofence of the identified one or more geofences;

after said identifying at least one topic associated with each geofence of the identified one or more geofences, said processing server identifying, from analysis of each identified topic and the third data stored in the third data store, at least one subscriber of the plurality of subscribers having a subscription to at least one topic associated with a geofence of the identified one or more geofences; and after said identifying at least one subscriber, said processing server publishing the event description data across a network to a computer device directly accessed by each subscriber of the identified at least one subscriber, wherein the event is a road traffic accident, wherein the at least one topic associated with a first geofence of the identified one or more geofences includes a first topic of road traffic accidents, and wherein the at least one subscriber has a subscription to the first topic pertaining to road traffic accidents.

15. The computer program product of claim 14, wherein a hierarchical geographic topic schema stored in the second data store comprises topics hierarchically sequenced as geographic areas such that each geographic area after a topmost geographic area is a child of and is contained within an immediately preceding geographic area in the geographic topic tree, wherein a hierarchical geofence schema stored in the second data store categorizes geofences into a hierarchy based on geographic area, wherein said identifying the at least one topic associated with each geofence comprises utilizing a mapping of the hierarchical geographic topic schema onto the hierarchical geofence schema to find said at least one topic associated with each geofence such that said at least one topic is found to be at least one geographic area in the hierarchical geographic topic schema.

16. The computer program product of claim 15, wherein the at least one geographic area in the hierarchical geographic topic schema consists of a plurality of geographic areas in the hierarchical geographic topic schema, and wherein the at least one topic associated with each geofence consists of the plurality of geographic areas in the hierarchical geographic topic schema.

17. A data processing network comprising a processing server, said processing server comprising a digital computer, said digital computer comprising a processor, a memory coupled to the processor, and a computer readable storage device coupled to the processor, said storage device comprising software code configured to be executed by the processor via the memory to implement a method for providing location specific information, said method configured to be implemented in a data processing network, said method comprising:

said processing server receiving subscriptions to topics subscribed to by a plurality of subscribers, wherein the processing server comprises three distinct data stores consisting of a first data store, a second data store, and a third data store, wherein first data stored in the first data store consists of a plurality of locations and an associated at least one geofence within which each location stored in the first data store is located interior to each exterior boundary of the at least one geofence, wherein second data stored in the second data store consists of a plurality of topics and a geofence to which each topic is associated such that each said geofence identified in the second data store is identified in the first data in the first data store in association with a location of the plurality of locations, wherein third data stored in the third data store consists of a subscriber profile of each subscriber of the plurality of subscribers along with a topic that each subscriber has subscribed to such that each subscribed to topic is comprised by the plurality of topics in the second data in the second data store, and wherein each geofence has a geometric shape located within a geographic area;

after said receiving subscriptions, said processing server receiving event data pertaining to an event that has occurred, said event data being received from an event reporting system that has gathered the event data from a data gathering means situated where the event has occurred, wherein the event data comprises location identification data from which a location of the event may be determined and event description data that describes the event;

after said receiving event data, said processing server identifying, from the location identification data in the received event data and the first data in the first data store, one or more geofences associated with the location determined from the location identification data;

after said identifying one or more geofences, said processing server identifying, from analysis of the identified one or more geofences and the second data stored in the second data store, at least one topic associated with each geofence of the identified one or more geofences;

after said identifying at least one topic associated with each geofence of the identified one or more geofences, said processing server identifying, from analysis of each identified topic and the third data stored in the third data store, at least one subscriber of the plurality of subscribers having a subscription to at least one topic associated with a geofence of the identified one or more geofences; and after said identifying at least one subscriber, said processing server publishing the event description data across a network to a computer device directly accessed by each subscriber of the identified at least one subscriber, wherein the event is a road traffic accident, wherein the at least one topic associated with a first geofence of the identified one or more geofences includes a first topic of road traffic accidents, and wherein the at least one subscriber has a subscription to the first topic pertaining to road traffic accidents.

18. The data processing network of claim 17, wherein a hierarchical geographic topic schema stored in the second data store comprises topics hierarchically sequenced as geographic areas such that each geographic area after a topmost geographic area is a child of and is contained within an immediately preceding geographic area in the geographic topic tree, wherein a hierarchical geofence schema stored in the second data store categorizes geofences into a hierarchy based on geographic area, wherein said identifying the at least one topic associated with each geofence comprises utilizing a mapping of the hierarchical geographic topic schema onto the hierarchical geofence schema to find said at least one topic associated with each geofence such that said at least one topic is found to be at least one geographic area in the hierarchical geographic topic schema.

19. The data processing network of claim 18, wherein the at least one geographic area in the hierarchical geographic topic schema consists of a plurality of geographic areas in the hierarchical geographic topic schema, and wherein the at least one topic associated with each geofence consists of the plurality of geographic areas in the hierarchical geographic topic schema.

20. The data processing network of claim 17, wherein the data processing network further comprises the data gathering means, wherein the data gathering means is configured to gather the event data, and wherein the data gathering means is selected from the group consisting of a camera, a speed sensor apparatus, a RFID reader, and a GPS device.

* * * * *